United States Patent [19]

Larson

[11] 4,025,014

[45] May 24, 1977

[54] STORAGE HOOK

[75] Inventor: Charles O. Larson, Sterling, Ill.

[73] Assignee: Charles O. Larson Co., Sterling, Ill.

[22] Filed: Oct. 30, 1975

[21] Appl. No.: 627,239

[52] U.S. Cl. .............................................. 248/203
[51] Int. Cl.$^2$ ........................................ F16M 13/00
[58] Field of Search .................... 211/4, 5; 248/203; 24/231, 241 R; 85/41

[56] References Cited

UNITED STATES PATENTS

| | | | |
|---|---|---|---|
| 173,115 | 2/1876 | Doty | 85/41 |
| 383,834 | 5/1888 | Stilwell | 85/41 UX |
| 464,465 | 12/1891 | Rogers | 85/41 |
| 595,670 | 12/1897 | Chambers | 211/4 |
| 1,313,044 | 8/1919 | Anderson | 248/48.2 |
| 3,782,672 | 1/1974 | Larson | 248/302 |
| 3,885,674 | 5/1975 | Rosenberg | 211/4 |

FOREIGN PATENTS OR APPLICATIONS

| | | | |
|---|---|---|---|
| 796,270 | 4/1936 | France | 211/5 |
| 18,751 | 8/1912 | United Kingdom | 24/231 |

*Primary Examiner*—William H. Schultz
*Attorney, Agent, or Firm*—Olson, Trexler, Wolters, Bushnell & Fosse, Ltd.

[57] ABSTRACT

A hook storage device is provided for locking a hung object against unauthorized removal. The device includes a J-shaped storage hook formed from a single length of rod stock. A closed eyelet is formed at a hook point end and an open eyelet is formed at a hook head end. A support eyebolt has a shank which can be fastened into a support, and a head terminating in a closed eyelet. In use, a flexible cable passes through the closed hook eyelet, through an object hung upon the hook, and through the closed eyebolt eyelet. A lock can be secured to cable ends to positively lock the storage hook, hung object, eyebolt, cable and lock itself together in a nondetachable, positively locked assembly.

1 Claim, 2 Drawing Figures

STORAGE HOOK

Background of the Invention

This invention relates generally to hardware and more particularly concerns a storage hook and associated apparatus which can be used to lock an object hung upon the storage hook against unauthorized removal.

Storage hooks have, of course, been known for a very long time. Among those modern hooks which have been offered with commercial success is that disclosed in U.S. Pat. No. 3, 782, 672 to Charles O. Larson.

When objects are hung for storage on open hooks in unattended places, they are, of course, subject to unauthorized removal. If the stored object is a bicycle of like valuable article, the temptation to theft or at least unauthorized use may become irresistable for some people.

It is therefore the general object of the present invention to provide a storage hook and associated apparatus which will secure or lock an object hung upon the hook so as to prevent its unauthorized removal.

Another object of the invention is to provide such hook and apparatus at a modest finished cost which will permit its offer to the public at a correspondingly modest sales price.

Yet another object is to provide a hook and associated apparatus which are constructed and assembled in a manner permitting installation and use to be made very clear to even those people who are generally unfamiliar with common practices of hardware installation and use.

Yet another object is to provide such a storage hook and associated apparatus which will prove to be rugged in use and will provide a long service life.

Other objects and advantages will become apparent upon reading the following detailed description and upon reference to the drawings. Throughout the description, like reference numerals refer to like parts.

Detailed Description

Figure 1:
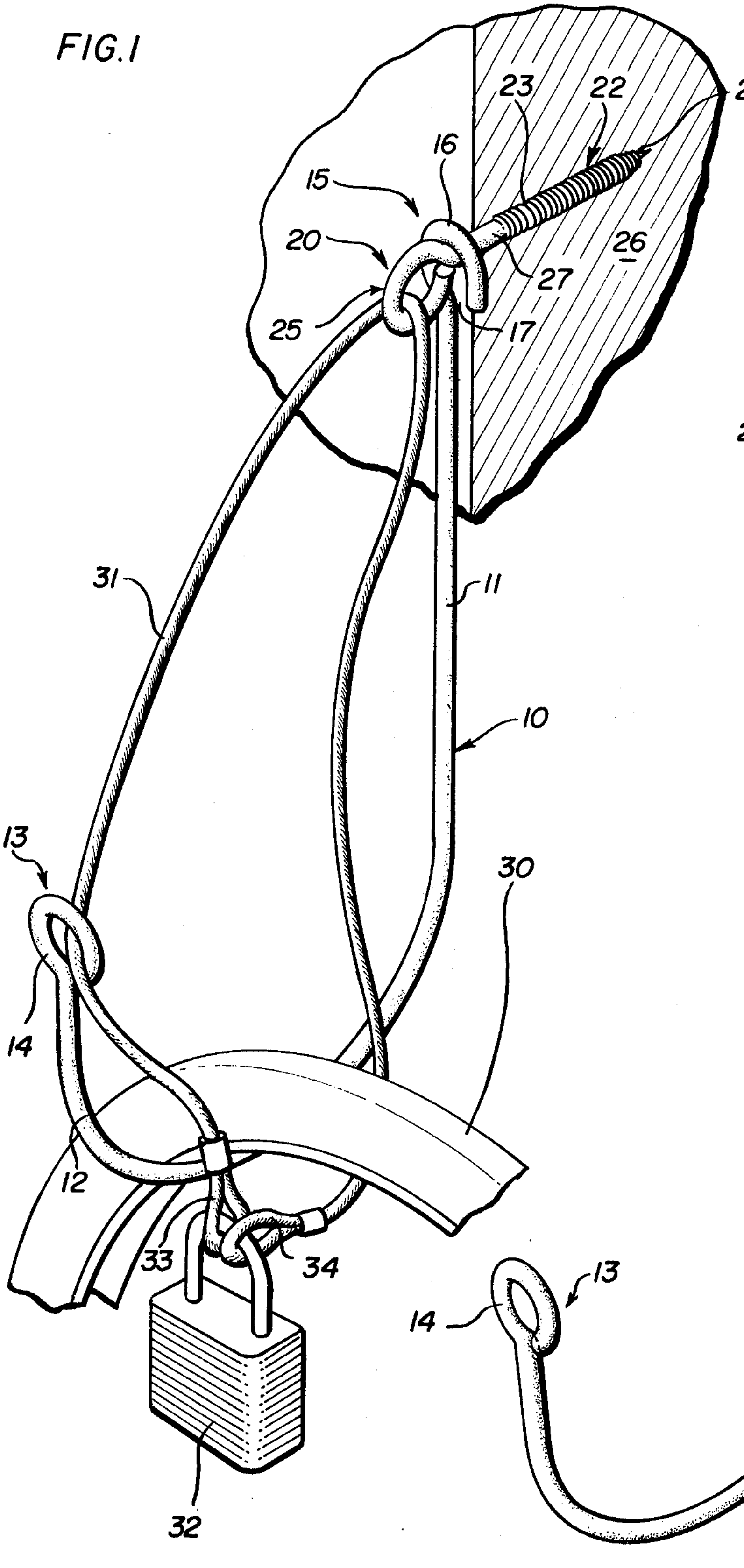
FIG. 1 is a perspective view showing the storage hook and associated apparatus as they appear when attached in a first configuration to a support.

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning more specifically to the drawings, there is shown a J-shaped storage hook 10. For convenience and low manufacturing cost in accordance with the invention, this hook 10 can be formed from a single length of rod or heavy wire stock. To increase useful life of this device and to inhibit rust from rubbing off the hook 10 and onto a stored object, it can be galvanized or otherwise finished. In shaped, the hook 10 includes a substantially straight, rigid leg 11 and a smoothly curved bight 12 lying in a single plane. The bight 12 terminates, at a point end 13, in a closed eyelet 14. Again for economy, this closed eyelet 14 can be formed by reversely bending a portion of the hook rod stock upon itself as illustrated. The closed eyelet 14 lies in a plane generally perpendicular to the plane of the leg 11 and bight 12 to provide a maximum bight opening, proper orientation for other device parts, and to present minimum obstruction to articles located adjacent the hook.

At the opposite or head end 15 of the hook 10, an open eyelet 16 is formed. Again, to promote economy of the finished product, this eyelet 16 can be formed by generally reversely bending a portion of the wire or rod stock constituting the hook 10 itself. The eyelet 16 lies in a plane generally perpendicular to the plane of the leg 11 and bight 12, and generally parallel to the plane of the closed eyelet 14 to properly orient the hook 10 relative to hook support structure.

The open eyelet 16 defines a mouth 17 between a tip 18 and eyelet shoulder 19; the mouth 17 is of sufficient extent to permit the open eyelet 16 to be attached and detached from a support structure. This support structure takes the form of an eyebolt 20 which comprises a pointed tip 21 and an elongated shank 22 defining threads 23 over at least a portion of the shank length. The shank 22 terminates in a closed eyelet 24 at an eyebolt head end 25. Fabrication economy can be further encouraged in accordance with the invention by forming the eyebolt 20 of wire or rod stock identical with that used in the fabrication of the hook 10. Galvanizing or other surface treatment can be applied to increase eyebolt surface life.

Figure 2:
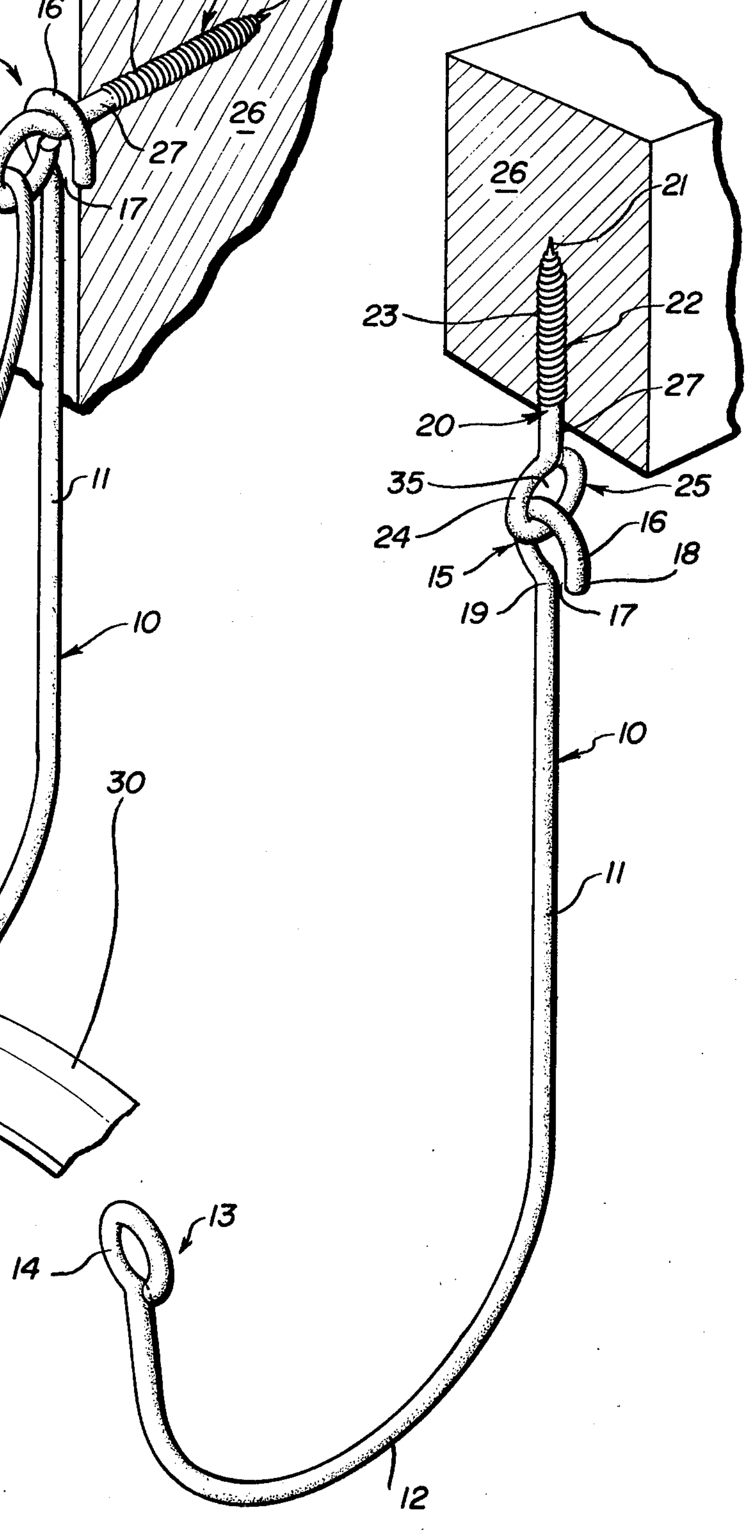
FIG. 2 is a perspective view similar to FIG. 1 but showing the hook and associated apparatus as they appear when attached to a support in an alternate configuration.

It is a feature of the invention that the storage hook 10 can be securely supported from the eyebolt 20 without damaging the eyebolt thread 23 or otherwise shortening the useful life of the storage device when the eyebolt 20 is secured to a support 26 in a horizontal configuration as shown in FIG. 1. To this end, the shank 22 is provided with an unthreaded portion 27 extending over a distance at least as long as the thickness or rod stock diameter of the open hook eyelet 16. As illustrated in FIG. 1, this open hook eyelet 16 can be hung over the horizontally disposed unthreaded eyebolt shank portion 27 to support the storage hook 10. When the eyebolt 20 is disposed vertically within and depending from the support 26 as illustrated in FIG. 2, the hook open eyelet 16 is simply slung through or hooked over the closed eyebolt eyelet 24.

To secure an object 30 hung upon the hook 10 from unauthorized removal or detachment, a flexible cable 31 passes through the closed hook eyelet 14, the object 30 itself, and through the closed eyebolt eyelet 20. In carrying out the invention, a locking device such as a padlock 32 can be attached to opposite ends 33 and 34 of the encircling cable 31 so as to positively lock the storage hook 10, the hung object 30, the eyebolt 20, the cable 31 and the lock 32 itself in a nondetachable, positively locked assembly. If desired, the closed eyelet 24 of the eyebolt 20 can be formed so as to encircle an open space 35 of sufficient size to accommodate both the open hook eyelet 16 and the flexible cable 31, when the eyebolt 20 is secured to the support 26 in a vertical position as shown in FIG. 2.

The invention is claimed as follows:

1. A hook storage device for locking a hung object against unauthorized removal comprising, in combination: a galvanized J-shaped storage hook formed from a single length of rod stock and including a substantially straight and rigid leg and a smoothly curved bight lying in a single plane, the bight terminating at a point end in a closed eyelet, and at a head end in an open eyelet, the open eyelet and closed eyelet lying in planes substantially parallel to one another and perpendicular to the plane of the leg and bight; a matching galvanized eyebolt including a pointed tip and a single, elongated shank threaded over a portion only of its length and extending, in use, into a support and terminating in a closed eyelet at a head end enclosing a space sufficient to accommodate the hook open eyelet and a flexible connector, the eyebolt eyelet being oriented, in use, substantially vertically and perpendicularly to the planes of the hook head and point eyelets, the eyebolt shank including an unthreaded shank length adjacent said eyebolt head extending over a distance as great as the thickness of the storage hook open eyelet to support the hook open eyelet and the storage hook when the eyebolt is secured to a support in a substantially horizontal position; flexible cable means passing, in use, through the closed hook eyelet, through an object hung upon the hook, and through the closed eyebolt eyelet; and locking means lockably attached to the two cable ends to positively lock the storage hook, hung object, eyebolt, flexible cable means and locking means itself together in a nondetachable, positively locked assembly.

* * * * *